(12) United States Patent
Kim et al.

(10) Patent No.: US 10,759,273 B2
(45) Date of Patent: Sep. 1, 2020

(54) STRUCTURE OF FUEL FILLER DOOR FOR VEHICLE

(71) Applicant: Sinjin Plastics Co., Ltd, Incheon (KR)

(72) Inventors: Jaehun Kim, Incheon (KR); Byungsang Kim, Incheon (KR)

(73) Assignee: Sinjin Plastics Co., Ltd, Incheon (KR)

( * ) Notice: Subject to any disclaimer, the term of this patent is extended or adjusted under 35 U.S.C. 154(b) by 0 days.

(21) Appl. No.: 16/265,597

(22) Filed: Feb. 1, 2019

(65) Prior Publication Data
US 2019/0241065 A1  Aug. 8, 2019

(30) Foreign Application Priority Data
Feb. 5, 2018  (KR) .................... 10-2018-0013822

(51) Int. Cl.
*B60K 15/05* (2006.01)
*E05D 3/02* (2006.01)

(52) U.S. Cl.
CPC ........ *B60K 15/05* (2013.01); *B60K 2015/053* (2013.01); *B60K 2015/0576* (2013.01); *B60K 2015/0584* (2013.01); *E05D 3/02* (2013.01); *E05Y 2900/534* (2013.01)

(58) Field of Classification Search
CPC .. B60K 15/05; B60K 15/053; E05Y 2900/534

USPC ...................................................... 296/97.22
See application file for complete search history.

(56) References Cited

U.S. PATENT DOCUMENTS 7,380,861 B2 * 6/2008 Engel ..................... B60K 15/05
                                              296/97.22
8,870,582 B2 * 10/2014 Yamamaru ............... B60K 1/04
                                                 439/135
9,539,896 B2 * 1/2017 Jones .................... B60K 15/05

FOREIGN PATENT DOCUMENTS

| JP | 2007-269258 A | 10/2007 |
| JP | 2015-202802 A | 11/2015 |
| KR | 10-0837932 B1 | 6/2008 |
| KR | 10-2012-0022400 A | 3/2012 |

* cited by examiner

*Primary Examiner* — Dennis H Pedder
(74) *Attorney, Agent, or Firm* — Studebaker & Brackett PC

(57) ABSTRACT

A structure of a fuel filler door for a vehicle includes a door hinge having one end portion hinged with a vehicle body, a support unit coupled to an opposite end portion of the door hinge, and a cover plate coupled onto the support unit. A fixing mount is provided to protrude from an inner surface of the support unit and includes a coupling hole formed through the fixing mount, a hook member is provided to protrude from an inner surface of the cover plate and includes a bending part slidably inserted into the coupling hole.

13 Claims, 16 Drawing Sheets

STRUCTURE OF FUEL FILLER DOOR FOR VEHICLE

CROSS-REFERENCE TO RELATED APPLICATIONS

A claim for priority under 35 U.S.C. § 119 is made to Korean Patent Application No. 10-2018-0013822 filed Feb. 5, 2018 in the Korean Intellectual Property Office, the entire content of which is hereby incorporated by reference.

BACKGROUND

Embodiments of the inventive concept described herein relate to structures of fuel filler doors for vehicles, and more particularly, relate to structures of fuel filler doors for vehicles, capable of improving the endurance of the fuel filler door as the fuel filler door is provided in a dual structure and of simply and strongly coupling the fuel filler door having the simple dual structure.

In general, a fuel filler is formed at one side of a vehicle to inject fuel necessary for the driving of the vehicle, and doubly blocked.

In other words, the fuel filler is doubly blocked by using a cap directly covering the fuel filler, which is to inject fuel, and a door to maintain the outer appearance of the vehicle beautiful by hiding the cap from the outside. Accordingly, the fuel filler is configured allowing a user to open or close the cap by opening the door only when injecting fuel.

Conventionally, a typical fuel filler door includes, as illustrated in FIG. 1, a door body part 10 having one end including a hinge part 20 rotatably coupled to a vehicle body, a spring 3 being provided at the hinge part 20. The fuel filler door is provided at an opposite end thereof with a hook part 30 protruding to maintain the door in a closed state as the door is locked to a door locking member 2, which is actuated by the operation of an opening/closing handle, which is mounted inside the vehicle.

However, as the conventional fuel filler door having the above-described configuration having a simple plate shape, the fuel filler door is not only weak for an impact, but has a weak supporting force between the vehicle body and the door body part 1. Accordingly, when the fuel filler door is used for a long time, the door body part 1 may be deformed.

In addition, when the door body part 1 is deformed, as the gap between the vehicle body and the door body part 1 is made, noise may be caused during the driving.

SUMMARY

Embodiments of the inventive concept provide structures of fuel filler doors for vehicles, capable of improving the endurance of the fuel filler door as the fuel filler door is provided in a dual structure, and of simply and strongly coupling the fuel filler door having the simple dual structure.

In addition, embodiments of the inventive concept provide structures of fuel filler doors for vehicles, capable of strongly maintaining the coupling state of a cover plate coupled onto a support unit in a strong coupling state without being shaken, due to the coupling structure between the support unit and the cover plate, even if external force is applied to the fuel filler doors in a left-right direction or an up-down direction.

According to an aspect of an embodiment, a structure of a fuel filler door for a vehicle, includes a door hinge having one end portion hinged with a vehicle body, a support unit coupled to an opposite end portion of the door hinge, and a cover plate coupled onto the support unit. A fixing mount is provided to protrude from an inner surface of the support unit and includes a coupling hole formed through the fixing mount, and a hook member is provided to protrude from an inner surface of the cover plate and including a bending part slidably inserted into the coupling hole.

In this case, the support unit includes a support plate coupled to the opposite end portion of the door hinge, and a sidewall protruding from an edge of the support plate. The fixing mount protrudes from the inner surface of the support plate.

In addition, a guide protrusion is formed to protrude from the support plate to guide a bending part of the hook member such that the bending part is coupled into the coupling hole of the fixing mount.

Further, the fixing mount includes a support member bent from upper and lower end portions of the fixing mount to restrict movement of the hook member in an up-down direction.

In addition, the fixing mount and the hook member further include reinforcement members provided in a direction perpendicular to the support plate and the cover plate, respectively.

In addition, the cover plate includes a fixing member formed on the inner surface of the cover plate and including a vertical part protruding from the inner surface of the cover plate and a horizontal part formed to have a right angle with respect to an end portion of the vertical part. The support plate includes a fixing protrusion formed on the inner surface of the support plate to support an end portion of the horizontal part of the fixing member.

In this case, the bending part of the hook member and the horizontal part of the fixing member protrude while facing opposite directions.

A tool insertion hole is formed in a portion, which is positioned at one side of the fixing protrusion, of the support plate.

In addition, at least one guide member is provided on the inner surface of the cover plate, and at least one guide groove is formed in the support unit to guide the at least one guide member such that the cover plate is slidably coupled to the support unit.

Meanwhile, a first guide member is provided to protrude from the inner surface of the cover plate, and a first guide groove is provided in the inner surface of the support unit to receive the first guide member such that the first guide member is prevented from being exposed to an outside.

Further, a second guide member is provided to protrude from the inner surface of the cover plate, and a second guide groove is provided by partially cutting out a sidewall of the support unit, to receive the second guide member.

In this case, the second guide groove has a length corresponding to a distance between a point that the hook member is coupled to the fixing mount and a point that the hook member is completely separated from the fixing mount.

In addition, a first guide member and a second guide member are provided to protrude from the inner surface of the cover plate while facing each other, with the fixing mount interposed between the first guide member and the second guide member. The support unit includes a first guide groove and a second guide groove to receive the first guide member and the second guide member disposed to face each other while interposing the hook member between the first guide member and the second guide member. The second guide groove is provided by partially cutting out a sidewall of the support unit.

As described above, according to the inventive concept, the endurance of the fuel filler door may be improved as the fuel filler door is provided in a dual structure and the fuel filler door having the simple dual structure may be simply and strongly coupled.

In addition, according to the inventive concept, the hook member and the fixing member of the cover plate are formed in opposite directions, thereby preventing the cover plate from being separated and shaken by external force applied to the cover plate in the left-right direction.

Further, according to the inventive concept, the hook member may be restricted from being moved or shaken in the up-down direction of the hook member by the fixing mount formed in the substantially 'C' shape, thereby additionally preventing the cover plate from being shaken by the external force.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
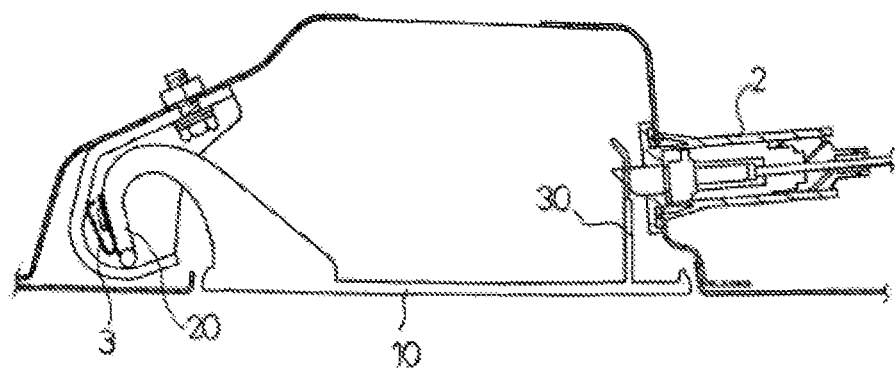
FIG. 1 is a sectional view schematically illustrating the mounting state of the structure of a conventional fuel filler door for a vehicle.

Advantage points and features of the inventive concept and a method of accomplishing thereof will become apparent from the following description with reference to the following drawings, wherein embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the inventive concept to those skilled in the art. The inventive concept may be defined by scope of the claims. Meanwhile, the terminology used herein to describe embodiments of the inventive concept is not intended to limit the scope of the inventive concept.

The terminology used in the inventive concept is provided for the illustrative purpose, but the inventive concept is not limited thereto. As used herein, the singular terms "a," "an" and "the" are intended to include the plural forms as well, unless the context clearly indicates otherwise. Furthermore, it will be further understood that the terms "comprises", "comprising," "includes" and/or "including", when used herein, specify the presence of stated components, steps, operations, and/or devices, but do not preclude the presence or addition of one or more other components, steps, operations and/or devices. The same reference numerals will be assigned to the same component throughout the whole specification, and "and/or" refers to that components described include not only individual components, but at least one combination of the components. It will be understood that, although the terms "first", "second", etc., may be used herein to describe various components, these components should not be limited by these terms. These terms are only used to distinguish one component from another component. Thus, a first component to be described below may be a second component without departing from the teachings of the inventive concept.

Unless otherwise defined, all terms (including technical and scientific terms) used herein have the same meaning as commonly understood by those skilled in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a fuel filler door according to exemplary embodiments of the inventive concept will be described in detail with reference to accompanying drawings.

Before the description, according to some embodiments, one embodiment will be representatively described by assigning the same reference numbers to components having the same features. According to other embodiments, the feature different from the feature of the previous embodiment will be described.

Figure 2:
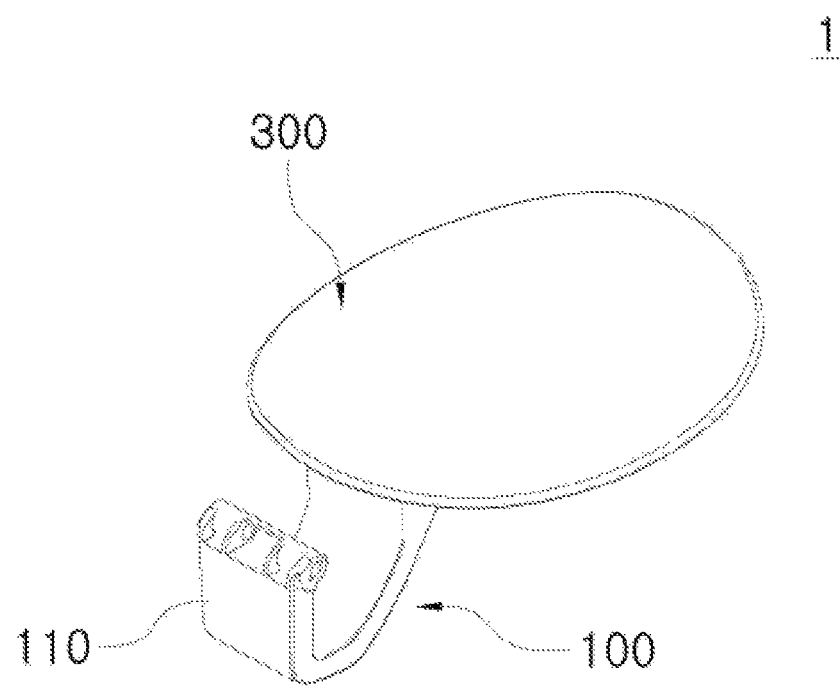
FIG. 2 is a perspective view illustrating the structure of a fuel filler door for a vehicle, according to an embodiment of the inventive concept.
Figure 3:
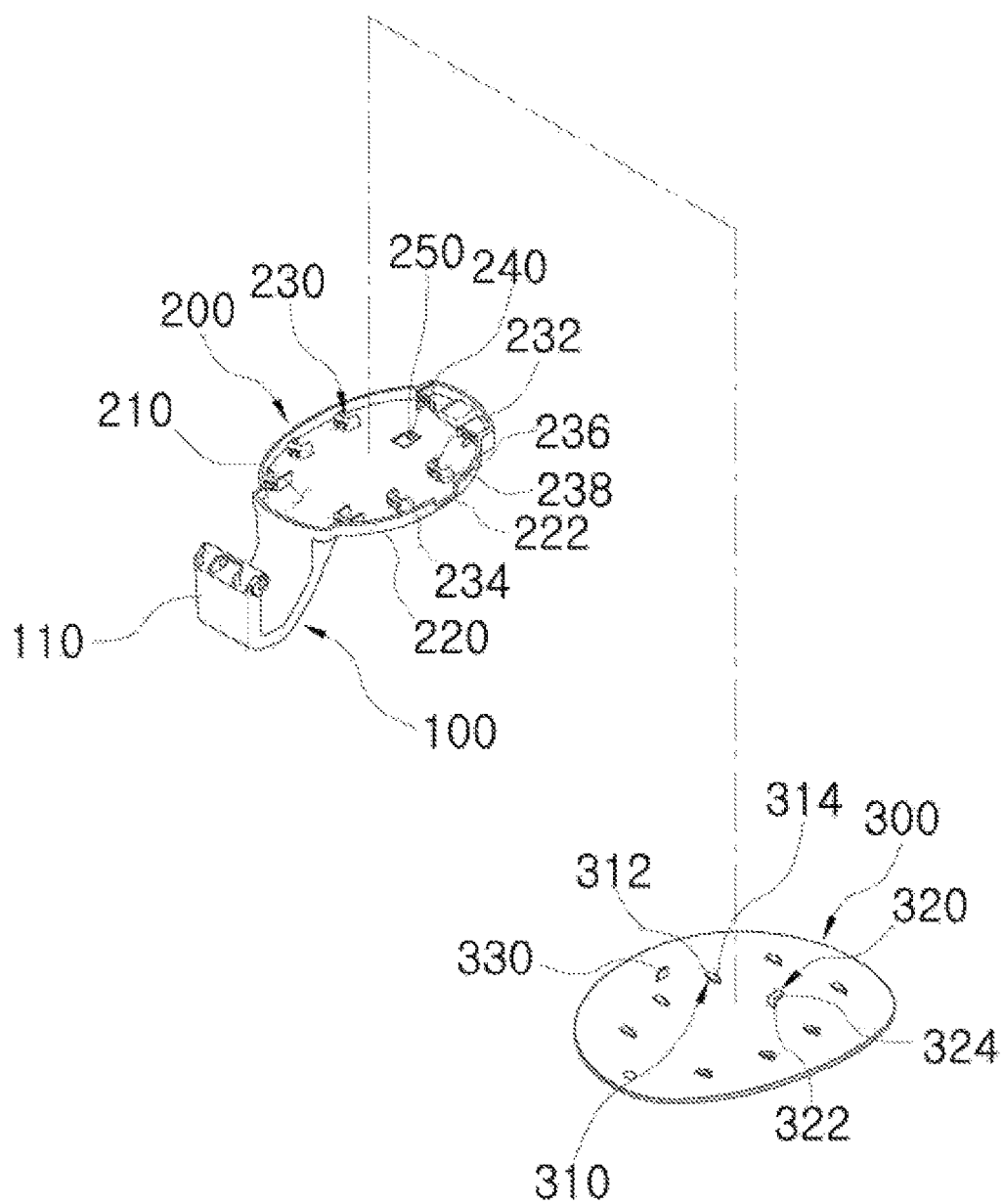
FIG. 3 is an exploded perspective view of FIG. 2.
Figure 4:
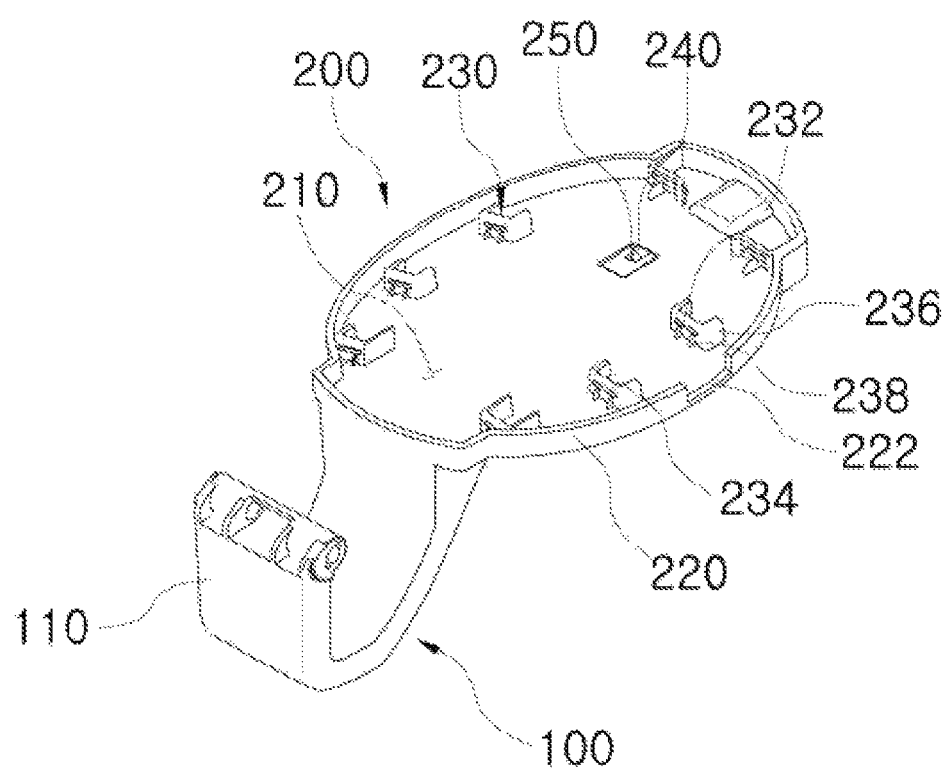
FIG. 4 is a perspective view illustrating a door hinge and a support unit of FIG. 3.
Figure 5:
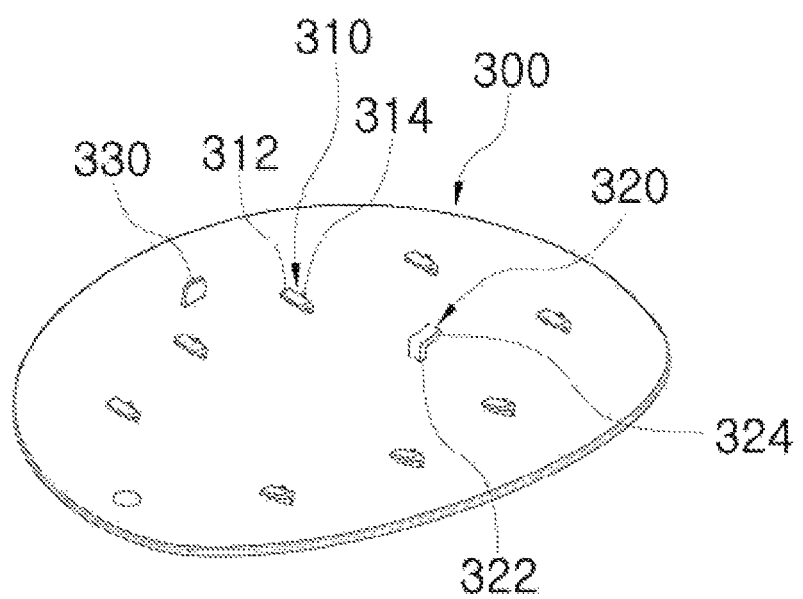
FIG. 5 is a perspective view illustrating a cover plate of FIG. 3.

FIG. 2 is a perspective view illustrating the structure of a fuel filler door for a vehicle, according to an embodiment of the inventive concept, FIG. 3 is an exploded perspective view of FIG. 2, and FIG. 4 is a perspective view illustrating a door hinge and a support unit of FIG. 4. FIG. 5 is a perspective view illustrating a cover plate 300 of FIG. 3, and FIGS. 6A and 6B, and FIGS. 7A and 7B illustrating a support unit and a cover plate before and after the cover plate is slidably coupled to the support unit.

The inventive concept relates to the structure of a fuel filler door for a vehicle, capable of improving the endurance of the fuel filler door as the fuel filler door is provided in a dual structure and of simply and strongly coupling the fuel filler door having the dual structure. The structure of the fuel filler door mainly includes a door hinge 100, a support unit 200, and a cover plate 300, as illustrated in FIGS. 2 and 3.

First, the door hinge 100 has one end portion hinged with a vehicle body such that a fuel filler door 1 (hereinafter, referred to as "door 1") rotates about a hinge coupling part 110, thereby allowing the door 1 to open or close in a hinged type. The detailed feature of the door hinge 100 is the same as a door hinge provided in a conventional door structure, so the details thereof will be omitted in the following description.

Next, the support unit 200 is coupled to an opposite end portion of the door hinge 100 such that the door 1 is open or closed as the door hinge 100 rotates, and is coupled to the cover plate 300, which is to be described below, to support the cover plate 300. The support unit 200 includes a support plate 210 and a sidewall 220.

In more detail, the support plate 210 is coupled to the opposite end portion of the door hinge 100 to transmit the rotation force of the door hinge 100 to the cover plate 300 while supporting a lower portion of the cover plate 300, that is, an inner surface of the cover plate 300. The sidewall 220 protrudes from the edge of the support plate 210 to allow the cover plate 300 to be coupled to the door hinge 100. In addition, the sidewall 220 is introduced into a housing (not illustrated) of a vehicle to support the cover plate 300.

In other words, the support plate 210 has a shape corresponding to a shape of an entrance of a door housing formed in the vehicle body and is inserted into the door housing. The sidewall 220 protrudes from the edge of the support plate 210 to face the outside of the door housing and is supported by the entrance of the door housing. In addition, the sidewall 220 may support the inner surface of the cover plate 300 coupled to the upper portion of the sidewall 220.

Next, the cover plate 300 is coupled onto the support unit 200, in more detail, the upper portion of the sidewall 220 of the support unit 200 to cover the fuel filler of the vehicle body. The cover plate 300 has a rectangular shape or a circular shape corresponding to a shape of the fuel filler formed in the vehicle body and is slidably coupled onto the support unit 200.

Therefore, according to the structure of the fuel filler door for the vehicle of the inventive concept, unlike a conventional door structure to open or close the cover plate 300 simply coupled to the door hinge 100, the inner surface of the cover plate 300 may be supported by the support unit 200 including the support plate 210 and the sidewall 220, thereby improving impact resistance. In addition, the sidewall 220 of the support unit 200 may be supported by the entrance of the fuel filler, that is, the entrance of the door housing formed in the vehicle body, thereby reducing the gap between the vehicle body and the door 1 and preventing the shape of the door 1 from being deformed to improve the endurance.

Meanwhile, the cover plate 300 is slidably coupled onto the support unit 200. To this end, a plurality of hook members 310 are provided on the inner surface of the cover plate 300 and a plurality of fixing mounts 230 are formed on the inner surface of the support plate 210 of the support unit 200 such that the hook members 310 are inserted into the fixing mounts 230 while sliding.

In other words, the hook member 310 and the fixing mount 230 allow the cover plate 300 to be slidably coupled and fixed onto the support unit 200 while preventing the cover plate 300 fixed onto the sidewall 220 of the support unit 200 from being shaken by external force such as vibration or an impact occurring during the driving of the vehicle.

In more detail, as illustrated in FIG. 5, the hook member 310 protrudes in a lengthwise direction of one side of the cover plate 300, from the inner surface of the cover plate 300 or fixed onto the inner surface of the cover plate 300. In the hook member 310, a bending part 312 protrudes in one direction such that the bending part 312 is slidably inserted into a coupling hole 232 of the fixing mount 230 to be described below.

In addition, as illustrated in FIGS. 3 and 4, the fixing mount 230 protrudes upward from the inner surface of the support plate 210 in the lengthwise direction or is fixed onto the inner surface of the support plate 210 to correspond to the mounting position of the hook member 310. The coupling hole 232 is formed through the fixing mount 230 such that the bending part 312 of the hook member 310 is inserted into the coupling hole 232 while sliding.

In this case, a guide protrusion 234 may be coupled to and mounted under the coupling hole 232 of the fixing mount 230. When the cover plate 300 is slidably coupled onto the support unit 200, the guide protrusion 234 is formed on the support plate 210 while protruding in a direction that the hook member 310 is introduced, thereby guiding the bending part 312 of the hook member 310 to be exactly inserted into the coupling hole 232 formed in the fixing mount 230.

In addition, the fixing mount 230 may further include a support member 236. The support member 236 is formed to be bent in a direction perpendicular to upper and lower end portions of the fixing mount 230, which is mounted on the support plate 210 in the lengthwise direction of one side of the support plate 210, to substantially the shape of V'", thereby supporting the hook member 310 slidably coupled to the fixing mount 230.

In other words, the support member 236 is formed to be bent in the direction that the hook member 310 is introduced from the upper and lower end portions of the fixing mount 230 to support the upper and lower portions of the hook member 310 slidably coupled into the fixing member 230. Accordingly, even if load is applied to the door 1 in an up-down direction of the door 1 during the driving of the vehicle, the cover plate 300 may be maintained in a strong fixing state without being shaken on the support unit 200

In addition, the hook member 310 and the fixing mount 230 may further include reinforcement members 314 and 238, and the reinforcement members 314 and 238 are formed at an opposite side to a side of the hook member 310 from which the bending part 312 protrudes and at an opposite side to a side of the fixing mount 230 from which the support member 236 protrudes to support the hook member 310 and the fixing mount 230, respectively. Accordingly, the reinforcement members 314 and 238 reinforce the hook member 310 and the fixing mount 230 to prevent the hook member 310 and the fixing mount 230 from being deformed or damaged by load applied from the outside.

When the bending part 312 and the support member 236 protrude in one direction of the hook member 310 and an opposite direction of the fixing mount 230, respectively, reinforcement members 314 and 238 protrude in an opposite direction of the hook member 310 and one direction of the fixing mount 230, respectively, so the hook member 310 and the fixing mount 230 are coupled to each other between the cover plate 300 and the support plate 210, thereby reinforcing the hook member 310 and the fixing mount 230.

Meanwhile, a fixing member 320 is provided on the inner surface of the cover plate 300, and a fixing protrusion 240 protrudes from the inner surface of the support plate 210 of the support unit 200 to support an end portion of the fixing member 320. The fixing member 320 and the fixing protrusion 240 prevent the cover plate 300, which is slidably coupled onto the support unit 200, from being separated from the support unit 200 and blocks the cover plate 300 from being shaken leftward or rightward by external force.

In more detail, the fixing member 320 is provided in the shape of "¬" in a lengthwise direction on the inner surface of the cover plate 300. A vertical part 322 of the fixing member 320 is formed integrally with or fixedly onto the inner surface of the cover plate 300, and a horizontal part 324 of the fixing member 320 is formed integrally with an end portion of the vertical part 322 toward an opposite side of the cover plate 300, that is, in an opposite direction to the direction of the bending part 312 of the hook member 310 while forming a right angle with respect to the end portion of the vertical part 322.

In addition, the fixing protrusion 240 protrudes in the vertical direction from the inner surface of the support plate 210 at a position which corresponds to a position of the fixing member 320. The fixing protrusion 240 has an inclined surface formed at an opposite side thereof, that is, in a direction that the fixing member 320 is introduced when the cover plate 300 is slidably coupled onto the support unit 200.

Figure 6A:
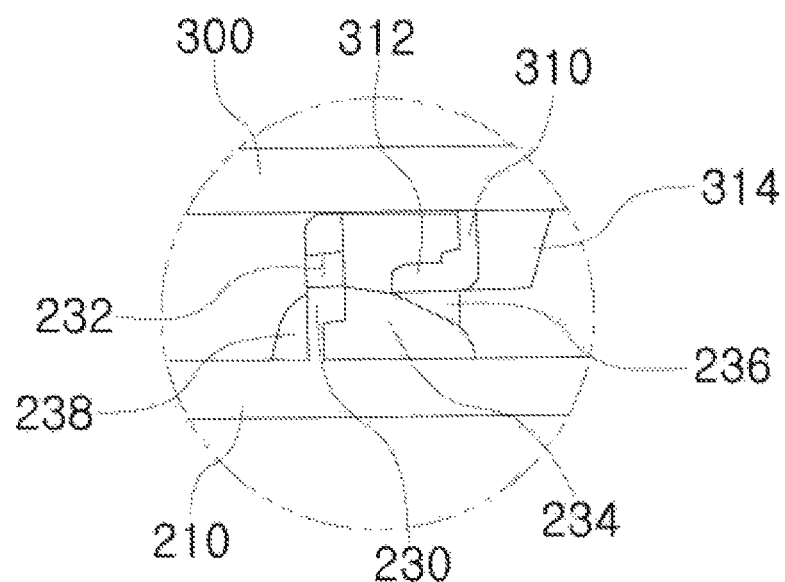
FIGS. 6A and 6B, and FIGS. 7A and 7B are sectional views schematically illustrating a support unit and a cover plate of FIG. 3 before and after the cover plate and the support plate are coupled to each other.
Figure 6B:
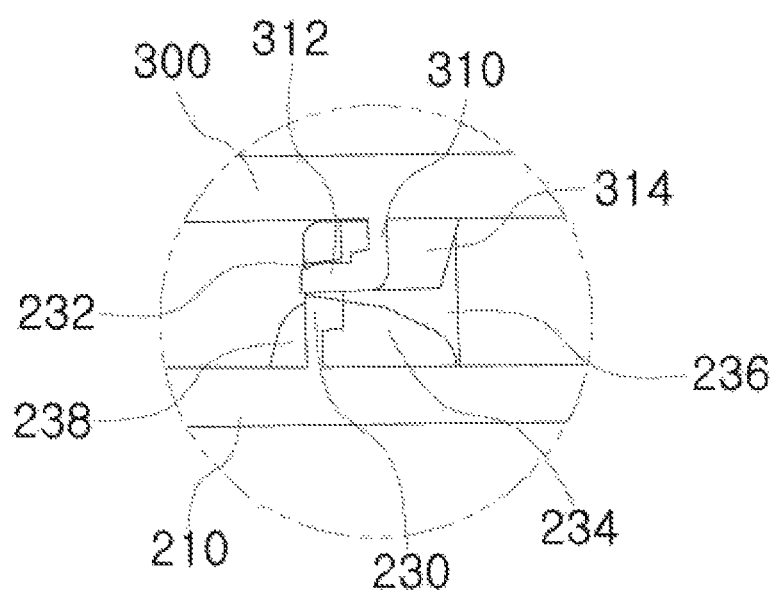

In other words, when the cover plate 300 is coupled onto the support unit 200, as illustrated in FIGS. 6A and 6B, the cover plate 300 is slidably coupled to the support plate 210 such that the bending part 312 formed in the hook member 310 of the cover plate 300 is inserted into the coupling hole 232 formed in the fixing mount 230 of the support plate 210. In the procedure that the bending part 312 is inserted into the coupling hole 232, the fixing member 320 formed in the cover plate 300 moves along the inclined surface of the fixing protrusion 240 while being pressed by the fixing protrusion 240 protruding from the inner surface of the support plate 210.

Figure 7A:
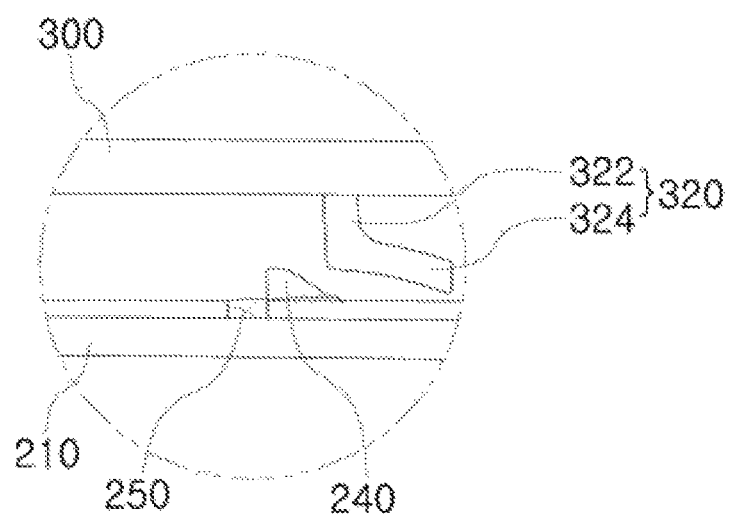
Figure 7B:
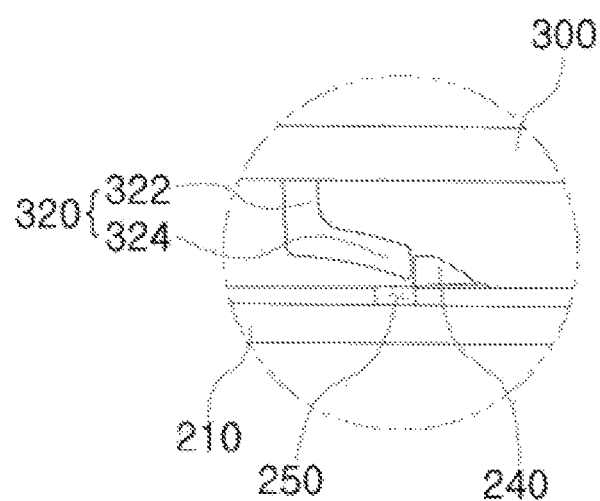

When the cover plate 300 is slidably coupled with the support plate 210 completely, that is, when the bending part 312 of the hook member 310 is completely coupled into the coupling hole 232 of the fixing mount 230, the fixing member 320 is separated from the fixing protrusion 240 and returns to the original state by elasticity as illustrated in FIGS. 7A and 7B, Accordingly, an end portion of the horizontal part 324 of the fixing member 320 is supported by the fixing protrusion 240 to prevent the cover plate 300 from moving in the direction that the slidable coupling of the cover plate 300 is released.

Accordingly, after the coupling of the cover plate 300 is completed, when a load is applied to the door 1 in a side direction during the driving of the vehicle, the cover plate 300 may be maintained in a strong fixing state on the support unit 200 without being shaken, due to the hook member 310 and the fixing member 320 provided in opposite directions, because the movement in one direction of the cover plate 300, that is, the movement in the direction that the cover plate 300 is slidably coupled is restricted by the hook member 310 inserted into the fixing mount 230, and the movement in the opposite direction of the cover plate 300, that is, the movement in the direction that the slidable coupling of the cover plate 300 is released is restricted by the fixing member 320 supported by the fixing protrusion 240.

In addition, a tool insertion hole 250 is formed in one side of the fixing protrusion 240, that is, in the support plate 210 in the direction of supporting the fixing member 320 by the fixing protrusion 240. The tool insertion hole 250 allows a user to release the supporting of the fixing member 320 by the fixing protrusion 240 by using a tool, thereby separating the cover plate 300 from the support unit 200.

In other words, as described above, since the bending part 312 of the hook member 310 of the cover plate 300 and the horizontal part 324 of the fixing member 320 protrude in opposition directions, when the bending part 312 of the hook member 310 is inserted into the coupling hole 232 formed in the fixing mount 230 as illustrated in FIG. 6B while the horizontal part 324 of the fixing member 320 is supported by the fixing protrusion 240 as illustrated in FIG. 7B, the support unit 200 restricts the movement of the cover plate 300 in the side direction. Accordingly, even if force is applied in one direction, for example, force is applied in the direction that the hook member 310 is separated from the fixing mount 230, the cover plate 300 may not be separated from the support unit 200. Accordingly, the tool is inserted into the tool insertion hole 250 formed in the support plate 210 to release the supporting state of the fixing member 320 by the fixing protrusion 240 in a manner of pressing the horizontal part 324 of the fixing member 320 toward the cover plate 300. Thereafter, force is applied in the direction that the hook member 310 is separated from the fixing mount, thereby separating the cover plate 300 from the support unit 200.

Meanwhile, a guide member 330 protrudes from the inner surface of the cover plate 300, and a guide groove 222 is formed in the sidewall 220 of the support unit 200 such that the guide member 330 is seated in the guide groove 222. The guide member 330 and the guide groove 222 guide the cover plate 300 to be slidably coupled onto the support unit 200.

In other words, to fixedly mount the cover plate 300 on the support unit 200, the hook members 310 provided in the cover plate 300 have to be exactly coupled to the fixing mounts 230 provided on the support plate 210. Accordingly, the position of the cover plate 300, which is to be slidably coupled onto the support unit 200, has to be exactly specified. The guide member 330 and the guide groove 222 are used to exactly specify the position of the above-described cover plate 300.

In more detail, when the cover plate 300 is slidably coupled onto the support unit 200, in the state of making contact with the sidewall 220 of the support unit 200, the inner surface of the cover plate 300 is moved in one direction, that is, in the direction that the hook member 310 is coupled to the fixing mount 230. In this case, when the guide member 330 of the cover plate 300 is seated into the guide groove 222 formed in the sidewall 220, the position of the cover plate 300 is automatically and exactly specified. Accordingly, all hook members 310 may be exactly coupled to the fixing mounts 230. Therefore, the cover plate 300 may be more easily coupled.

In addition, the height of the guide member 330 is formed to be equal to the depth of the guide groove 222, so the inner surface of the cover plate 300 is moved in an exact direction, when the inner surface of the cover plate 300 is moved in one direction in the state of making contact with the top surface of the sidewall 220 of the support unit 200, Accordingly, as described above, according to the inventive concept, in the structure of the fuel filler door for the vehicle, the endurance of the door 1 may be improved as the door 1 is provided in the dual structure, and the door 1 having the simple dual structure may be simply and strongly coupled. The hook member 310 and the fixing member 320 of the cover plate 300 are formed in opposite directions, thereby preventing the cover plate 300 from being separated and from being shaken by external force applied in a left-right direction. In addition, the hook member 310 may be restricted from being moved or shaken in the up-down direction of the hook member 310 by the fixing munt 230 formed in the substantially C shape, thereby additionally preventing the cover plate 300 from being shaken by the external force.

Meanwhile, FIGS. 8 to 12 illustrate a fuel filler door for a vehicle, according to another embodiment of the inventive concept.

As illustrated in FIGS. 8 to 12, according to another embodiment of the inventive concept, the fuel filler door for the vehicle includes a pair of guide members 330*a* and 330*b* and a pair of guide grooves 222*a* and 222*b*, unlike the above-described previous embodiment.

The pair of guide members 330a and 330b, which are the first guide member 330a and the second guide member 330b, protrude with specific widths and heights from the inner surface of the cover plate 300 in a direction that the hook member 310 is coupled to the fixing mount 230. The guide members 330a and 330b are provided to face each other while interposing the fixing mounts 230 therebeween.

The pair of guide grooves 222a and 222b are provided corresponding to the pair of guide members 330a and 330b, in the support plate 210. The first guide groove 222a receives the first guide member 330a and is formed in the inner surface of the support plate 210 such that the first guide groove 222a is prevented from being exposed to the outside. The guide groove 222b may be formed by partially cutting out the sidewall 220 of the support plate 210, like the previous embodiment described above. The first guide groove 222a and the second guide groove 222b are provided in the direction that the hook member 310 is coupled to the fixing mount 230. The first guide groove 222a and the second guide groove 222b have lengths corresponding to the distance between a point that the hook member 310 is coupled to the fixing mount 230 and a point that the hook member 310 is completely separated from the fixing mount 230.

Accordingly, the first guide member 330a and the first guide groove 222a, and the second guide member 330b and the second guide groove 222b may not only exactly specify the position of the cover plate 300 slidably coupled onto the support unit 200, but also allow the support unit 200 and the cover plate 300 to be stably and exactly coupled to each other when the cover plate 300 is slidably coupled onto the support unit 200. In addition, when the cover plate 300 is slidably coupled onto the support unit 200, a user may more easily specify the position of the cover plate 300 while viewing that the second guide member 330b moves along the second guide groove 222b.

In addition, the fuel filler door for the vehicle further includes a stopper 260 to restrict the movement.

The stopper 260 protrudes from the surface of the cover plate 300 while extending in the horizontal direction with respect to the direction that the hook member 310 is coupled to the fixing mount 230. The stopper 260 restricts the cover plate 300 from moving by a specific distance or more along the support unit 200 in the direction that the hook member 310 is coupled to the fixing mount 230, when the cover plate 300 is assembled with the support unit 200 as the hook member 310 is coupled to the fixing mount 230.

Figure 8A:
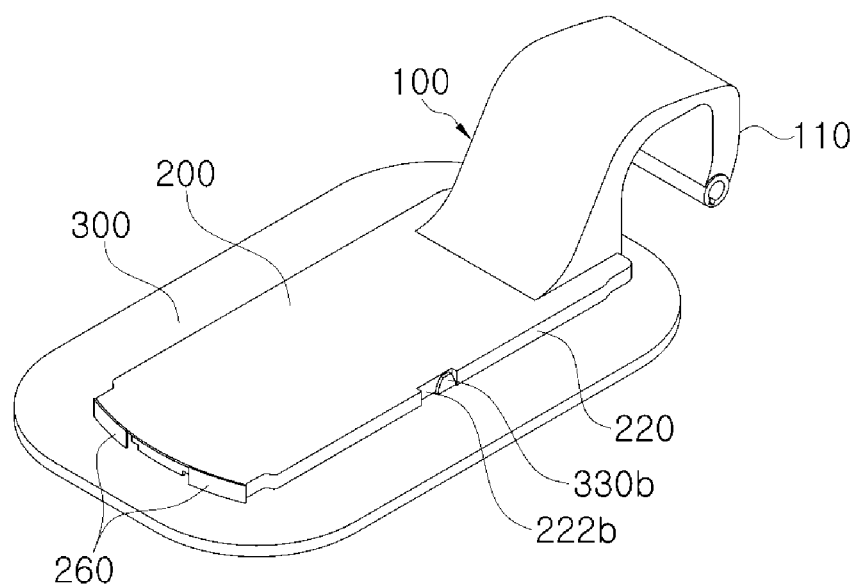
FIGS. 8A and 8B are perspective views illustrating the structure of the fuel filler door for the vehicle, according to an embodiment of the inventive concept.
Figure 8B:
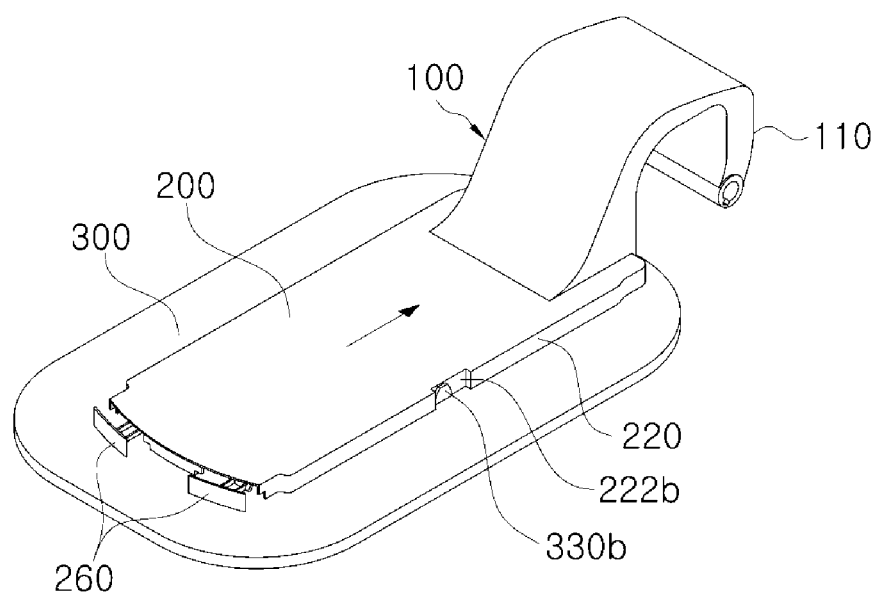
Figure 9:
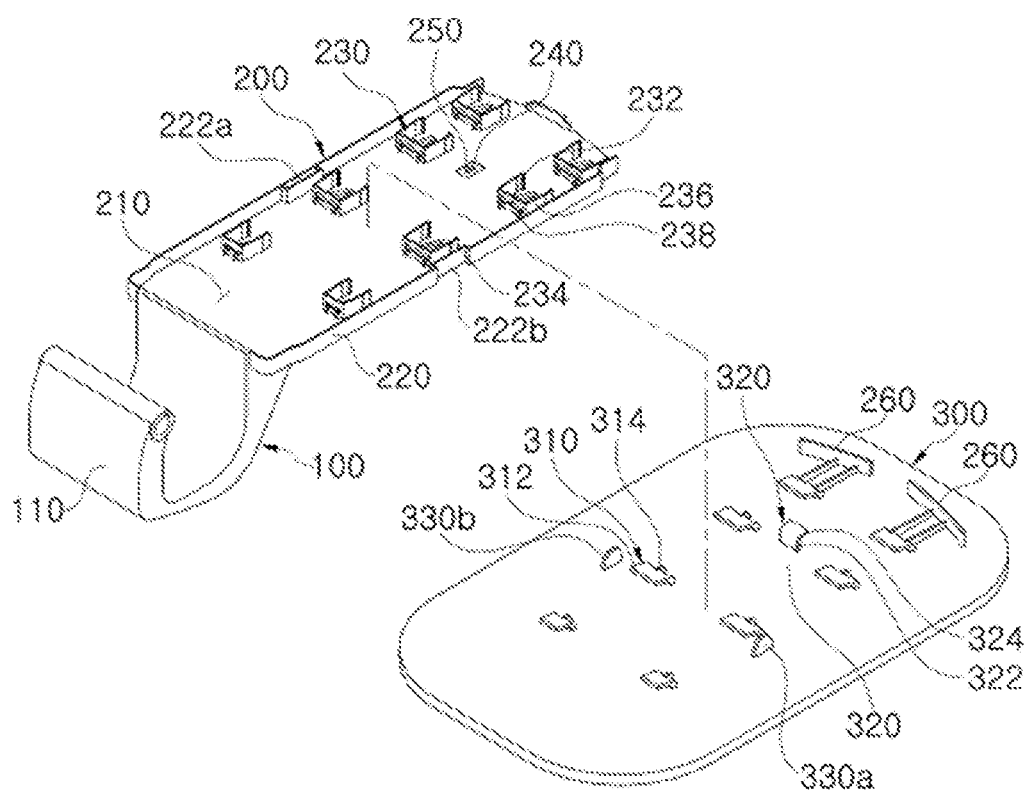
FIG. 9 is an exploded perspective view of FIG. 8.
Figure 10:
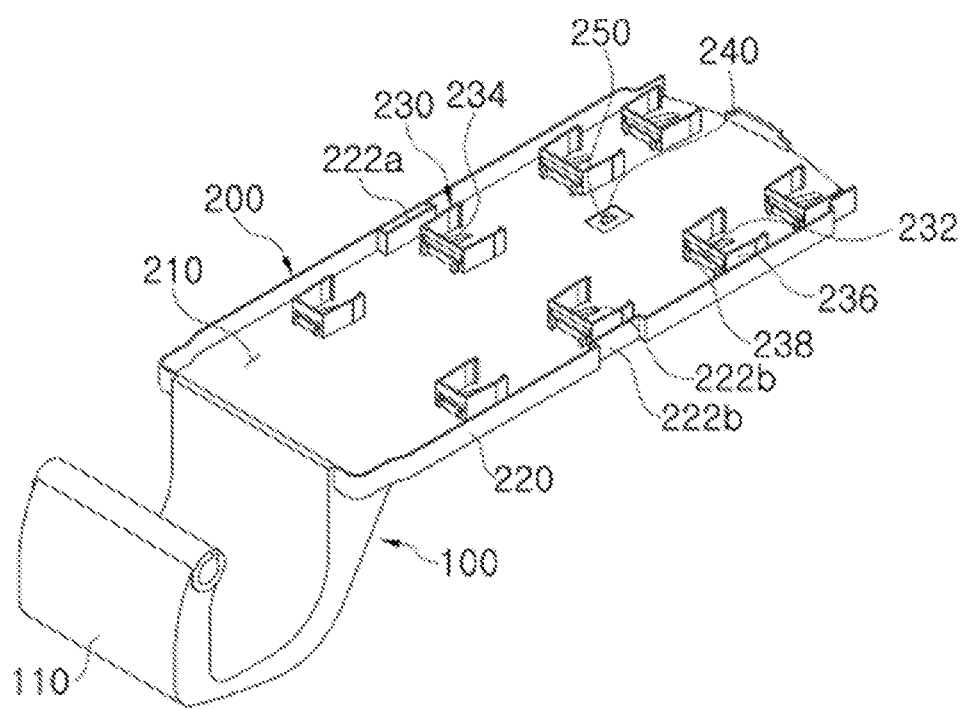
FIG. 10 is a perspective view illustrating the door hinge and the support unit of FIG. 9.
Figure 11:
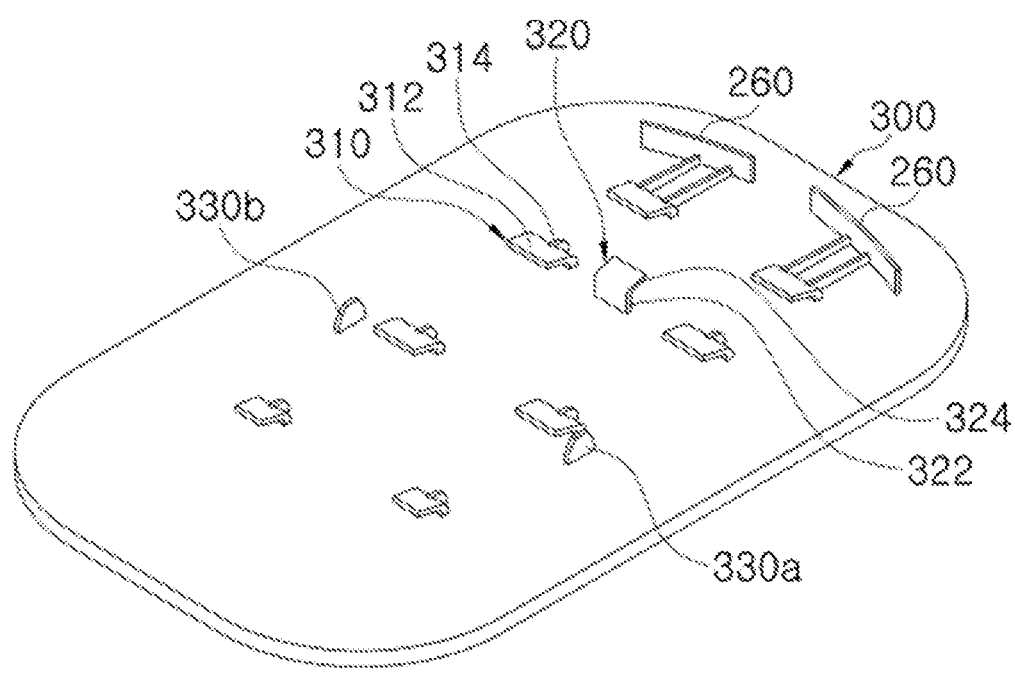
FIG. 11 is a perspective view illustrating the cover plate of FIG. 9.

Meanwhile, FIG. 8A illustrates that the cover plate 300 is assembled with the support unit 200 as the hook member 310 is coupled to the fixing mount 230, and FIG. 8B illustrates that the cover plate 300 is disassembled from the support unit 200 as the hook member 310 is decoupled from the fixing mount 230.

Figure 12A:
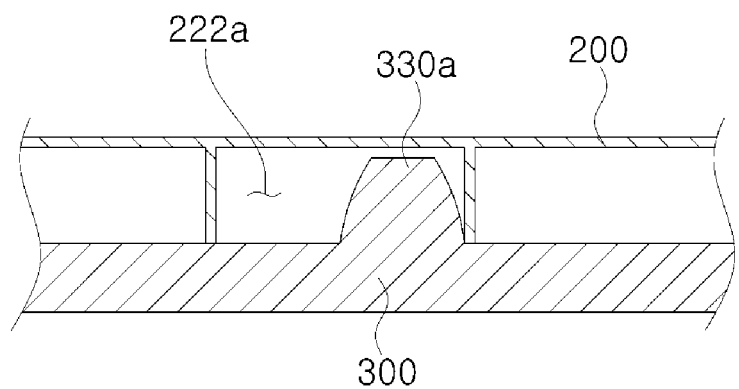
FIGS. 12A and 12B are sectional views schematically illustrating a first guide member and a first guide groove of FIG. 8 before and after the first guide member and the first guide groove of FIG. 8 are slidably coupled to each other.
Figure 12B:
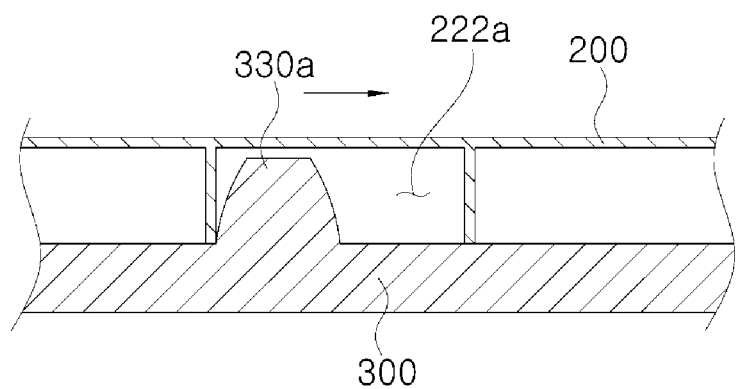

In addition, FIG. 12A illustrates the state of the first guide member 330a and the first guide groove 222a when the cover plate 300 is assembled with the support unit 200 as the hook member 310 is coupled to the fixing mount 230. FIG. 12B illustrates the state of the first guide member 330a and the first guide groove 222a when the hook member 310 is decoupled from the fixing mount 230.

Meanwhile, although the above-described embodiments have been described in that each of the guide member and the guide groove is provided in the singular or in pairs, the inventive concept is not limited thereto. For example, a pair of guide members and a pair of guide grooves may be provided.

In addition, although the above-described embodiments have been described as exemplary embodiments of the inventive concept, the inventive concept is not limited thereto. It could be apparent to those skilled in the art that components provided in the support plate 210 and the cover plate 300 may be formed integrally with each other or separately from each other and fixed to each other, that is, various modifications are possible within the scope of the inventive concept.

The inventive concept relates to a structure of a fuel filler door for a vehicle, and more particularly to the structure of a fuel filler door for a vehicle, capable of improving the endurance of the fuel filler door as the fuel filler door is provided in a dual structure and of simply and strongly coupling the fuel filler door having the simple dual structure.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A structure of a fuel filler door for a vehicle, the structure comprising:
    a door hinge having one end portion hinged with a vehicle body;
    a support unit coupled to an opposite end portion of the door hinge; and
    a cover plate coupled onto the support unit,
    wherein a fixing mount is provided to protrude from an inner surface of the support unit and includes a coupling hole formed through the fixing mount, and
    wherein a hook member is provided to protrude from an inner surface of the cover plate and including a bending part slidably inserted into the coupling hole.

2. The structure of claim 1, wherein the support unit includes:
    a support plate coupled to the opposite end portion of the door hinge; and
    a sidewall protruding from an edge of the support plate, and
    wherein the fixing mount protrudes from the inner surface of the support plate.

3. The structure of claim 2, wherein a guide protrusion is formed to protrude from the support plate to guide a bending part of the hook member such that the bending part is coupled into the coupling hole of the fixing mount.

4. The structure of claim 2, wherein the fixing mount includes a support member bent from upper and lower end portions of the fixing mount to restrict movement of the hook member in an up-down direction.

5. The structure of claim 2, wherein the fixing mount and the hook member further include reinforcement members provided in a direction perpendicular to the support plate and the cover plate, respectively.

6. The structure of claim 2, wherein the cover plate includes:
    a fixing member formed on the inner surface of the cover plate and including a vertical part protruding from the inner surface of the cover plate and a horizontal part formed to have a substantial right angle with respect to an end portion of the vertical part, and
    wherein the support plate includes a fixing protrusion formed on the inner surface of the support plate to support an end portion of the horizontal part of the fixing member.

7. The structure of claim 6, wherein the bending part of the hook member and the horizontal part of the fixing member protrude while facing opposite directions.

8. The structure of claim 6, wherein a tool insertion hole is formed in a portion, which is positioned at one side of the fixing protrusion, of the support plate.

9. The structure of claim 2, wherein at least one guide member is provided on the inner surface of the cover plate, and
wherein at least one guide groove is formed in the support unit to guide the at least one guide member such that the cover plate is slidably coupled to the support unit.

10. The structure of claim 1, wherein a first guide member is provided to protrude from the inner surface of the cover plate, and
wherein a first guide groove is provided in the inner surface of the support unit to receive the first guide member such that the first guide member is prevented from being exposed to an outside.

11. The structure of claim 1, wherein a second guide member is provided to protrude from the inner surface of the cover plate, and
wherein a second guide groove is provided by partially cutting out a sidewall of the support unit, to receive the second guide member.

12. The structure of claim 11, wherein the second guide groove has a length corresponding to a distance between a point that the hook member is coupled to the fixing mount and a point that the hook member is completely separated from the fixing mount.

13. The structure of claim 1, wherein a first guide member and a second guide member are provided to protrude from the inner surface of the cover plate while facing each other, with the fixing mount interposed between the first guide member and the second guide member,
wherein the support unit includes a first guide groove and a second guide groove to receive the first guide member and the second guide member disposed to face each other while interposing the hook member between the first guide member and the second guide member, and
wherein the second guide groove is provided by partially cutting out a sidewall of the support unit.

\* \* \* \* \*